(12) United States Patent  
Watanabe

(10) Patent No.: US 7,926,375 B2
(45) Date of Patent: Apr. 19, 2011

(54) TRANSMISSION CONTROL APPARATUS

(75) Inventor: Hideo Watanabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 37 days.

(21) Appl. No.: 12/578,867

(22) Filed: Oct. 14, 2009

(65) Prior Publication Data

US 2010/0093489 A1 Apr. 15, 2010

(30) Foreign Application Priority Data

Oct. 14, 2008 (JP) ................................ 2008-265410

(51) Int. Cl.
 *F16H 59/00* (2006.01)
(52) U.S. Cl. ........................................ 74/335

(58) Field of Classification Search ............... 74/335; 475/123
See application file for complete search history.

(56) References Cited

FOREIGN PATENT DOCUMENTS

| JP | 07035228 A | 2/1995 |
|---|---|---|
| JP | 2001165306 A | 6/2001 |
| JP | 2004060732 A | 2/2004 |
| JP | 2004144293 A | 5/2004 |

*Primary Examiner* — Dirk Wright
(74) *Attorney, Agent, or Firm* — Gifford, Krass, Sprinkle, Anderson & Citkowski, P.C.

(57) ABSTRACT

A control apparatus of a transmission, in which an ECU controls the transmission to upshift when an upshift condition is satisfied, controls the transmission to downshift when a downshift condition is satisfied, and cancels an upshift and maintains the speed ratio of the transmission when, before the upshift is completed, the upshift condition ceases to be satisfied even if a downshift condition is not satisfied.

6 Claims, 8 Drawing Sheets

TRANSMISSION CONTROL APPARATUS

INCORPORATION BY REFERENCE

The disclosure of Japanese Patent Application No. 2008-265410 filed on Oct. 14, 2008 including the specification, drawings and abstract is incorporated herein by reference in its entirety.

BACKGROUND OF THE INVENTION

1. Field of the Invention

The invention relates to a control apparatus of a transmission. More particularly, the invention relates to technology for canceling an upshift in a transmission.

2. Description of the Related Art

A transmission that shifts automatically is known. The speed ratios of the transmission are set taking factors such as fuel efficiency and acceleration required by the driver into account. For example, FIG. 7 of Japanese Patent Application Publication No. 7-35228 (JP-A-7-35228) illustrates a shift according to a shift map that has the throttle opening amount (or the accelerator operation amount) and the vehicle speed as parameters.

FIG. 7 of JP-A-7-35228 shows only downshift lines that establish a downshift condition, but in a typical shift map, upshift lines that establish an upshift condition is set in addition to the downshift lines so that there is hysteresis between the downshift lines.

However, in a transmission that shifts according to a shift map, if the accelerator operation amount or the throttle opening amount increases right after an upshift condition has been satisfied, it is possible that that upshift condition may cease to be satisfied before an upshift is completed.

In this case, the upshift may continue to be performed even though the driver requires acceleration. As a result, the driving force necessary to achieve the acceleration required by the driver may no longer be able to be obtained.

SUMMARY OF THE INVENTION

In view of the foregoing issues, the invention provides a transmission control apparatus capable of inhibiting the driving force from becoming insufficient.

One aspect of the invention relates to a control apparatus for a transmission, that includes a first controlling portion that controls the transmission to execute an upshift when an upshift condition is satisfied; a second controlling portion that controls the transmission to execute a downshift when a downshift condition is satisfied; and a first canceling portion which, after the upshift condition is satisfied but before the upshift is completed, cancels the upshift and maintains a speed ratio of the transmission when the upshift condition ceases to be satisfied while the downshift condition is not satisfied.

According to the control apparatus of a transmission as described above, an upshift is executed when an upshift condition is satisfied, and a downshift is executed when a downshift condition is satisfied. Also, if after the upshift condition has been satisfied but before the upshift is completed the upshift condition ceases to be satisfied, the upshift is canceled and the speed ratio of the transmission is maintained even if a downshift condition is not satisfied. As a result, if an upshift condition is satisfied but then ceases to be satisfied due to a slight increase in the accelerator operation amount, for example, the driving force will not decrease because the current speed ratio is maintained. Thus, it is possible to provide a transmission control apparatus capable of inhibiting the driving force from becoming insufficient.

The control apparatus may also include a second canceling portion that allows the upshift to be canceled if timing at which driving force is obtained by canceling the upshift is earlier than timing at which driving force obtained by continuing the upshift, and prohibits the upshift from being canceled if the timing at which driving force is obtained by canceling the upshift is later than the timing at which driving force can be obtained by continuing the upshift.

According to the control apparatus described above, an upshift is allowed to be canceled when timing at which driving force is obtained by canceling the upshift is earlier than timing at which driving force is obtained by continuing the upshift. Also, the upshift is prohibited from being canceled when the timing at which driving force is obtained by canceling the upshift is later than the timing at which driving force is obtained by continuing the upshift. Accordingly, the upshift is either canceled or continued, whichever enables driving force to be obtained faster. This makes it possible to more effectively inhibit driving force from becoming insufficient.

Also, in the control apparatus described above, the transmission may be coupled to a drive source via an apply element that is able to be switched between an applied state and a released state. The apply element may be released during execution of an upshift. The control apparatus may also include a third canceling portion that allows the upshift to be canceled before the apply element is released and prohibits the upshift from being canceled after the apply element is released.

According to the control apparatus as described above, the transmission is coupled to a drive source via an apply element that is able to be switched between an applied state and a released state, and is released during execution of an upshift. An upshift is allowed to be canceled before the apply element is released. As a result, if the driving force has not yet been interrupted, it can keep being obtained uninterrupted by canceling the upshift. Meanwhile, an upshift is prohibited from being canceled after the apply element has been released. As a result, after the driving force has been interrupted, it can be restored faster by continuing the upshift. This makes it possible to more effectively inhibit driving force from becoming insufficient.

Also, in the control apparatus described above, an upshift condition may be established to satisfy a first rule of requesting a larger speed ratio as an accelerator operation amount increases and requesting a smaller speed ratio as a vehicle speed increases. The control apparatus may also include a restricting portion, a requesting portion, a third controlling portion, and a restriction releasing portion. The restricting portion restricts an upshift to be executed as a result of the upshift condition being satisfied, after an upshift is canceled. The requesting portion requests a speed ratio based on a second rule of requesting a smaller speed ratio each time a predetermined period of time passes, when the upshift to be executed as the result of the upshift condition being satisfied is restricted. The third controlling portion controls the transmission to establish the speed ratio requested based on the second rule while the speed ratio requested based on the second rule is equal to or greater than the speed ratio requested based on the first rule. The restriction releasing portion releases the restriction on the upshift to be executed as the result of the upshift condition being satisfied, when the speed ratio requested based on the second rule becomes smaller than the speed ratio requested based on the first rule.

According to the control apparatus described above, an upshift condition to satisfy a first rule of requesting a larger speed ratio as an accelerator operation amount increases and requesting a smaller speed ratio as a vehicle speed increases is established. After an upshift has been canceled, an upshift to be executed as a result of the upshift condition being satisfied is restricted. A speed ratio is requested based on a second rule of requesting a smaller speed ratio each time a predetermined period of time passes, while the upshift to be executed as the result of the upshift condition being satisfied is restricted. The transmission is controlled to establish a speed ratio requested based on the second rule while the speed ratio requested based on the second rule is equal to or greater than the speed ratio requested based on the first rule. Then when the speed ratio requested based on the second rule becomes smaller than the speed ratio requested based on the first rule, the restriction on the upshift to be executed as the result of the upshift condition being satisfied is released. Accordingly, after an upshift has been canceled, an upshift can be executed after first maintaining the speed ratio for a period of time even if an upshift condition is satisfied. As a result, busy shifting can be suppressed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
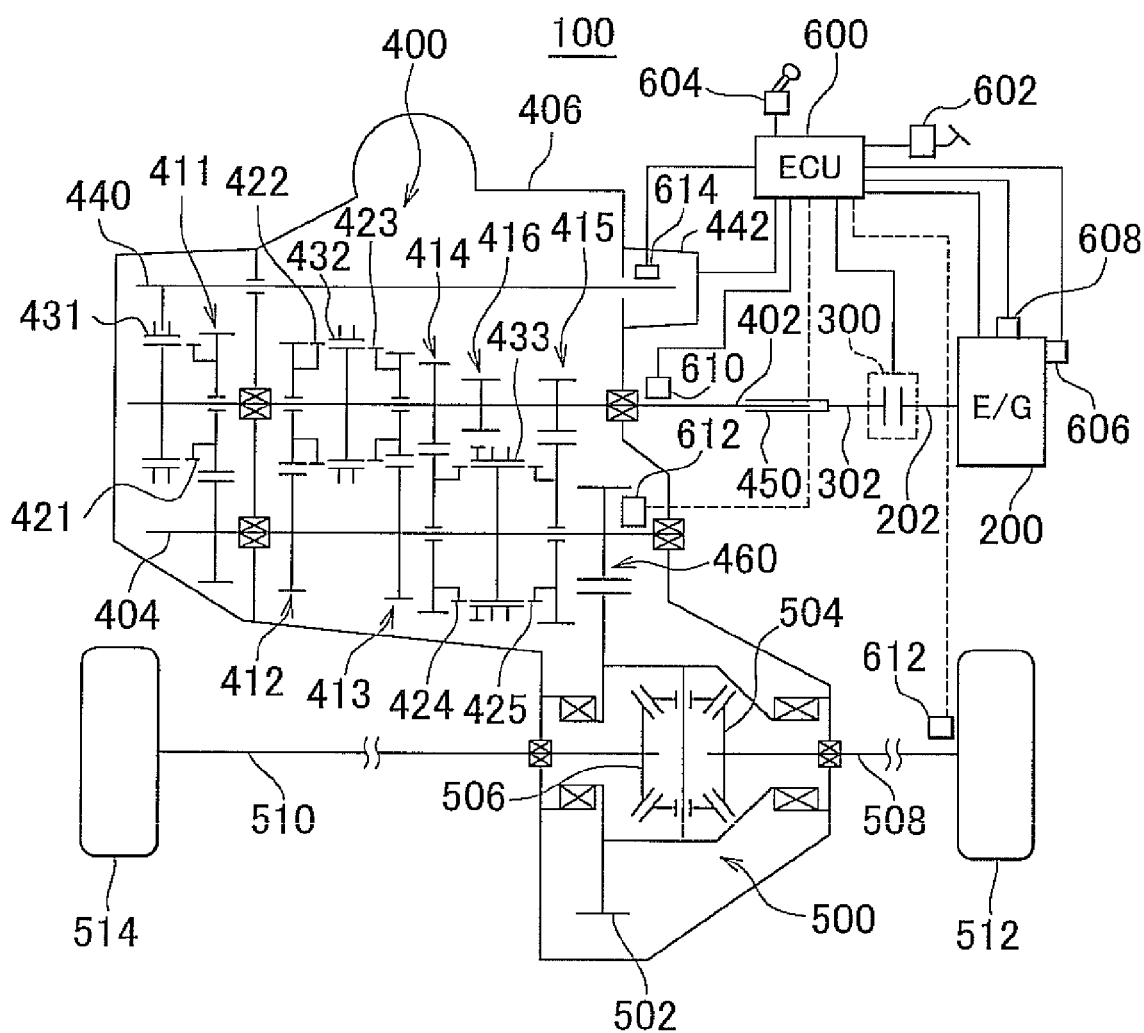
FIG. 1 is a block diagram schematically showing a vehicle to which a transmission control apparatus of example embodiments of the invention may be applied.

Example embodiments of the present invention will be described in greater detail below with reference to the accompanying drawings. In the following description, like parts will be denoted by like reference characters and referred to by the same nomenclature and have the same functions. Therefore, detailed descriptions of those parts will not be repeated.

A vehicle provided with a control apparatus according to a first example embodiment of the invention will now be described with reference to FIG. 1. The vehicle 100 is an FF (Front Engine Front Drive) type vehicle, though the vehicle provided with the control apparatus of the invention is not limited to a FF type vehicle.

The vehicle 100 has no clutch pedal, and instead establishes the desired speed by operating a clutch and a constant mesh gear transmission of the same type as a conventional manual transmission using an actuator. Incidentally, the vehicle may alternatively be provided with an automatic transmission formed of a planetary gear set or a CVT (Continuously Variable Transmission).

The vehicle 100 includes an engine 200, a clutch 300, a transmission 400, a differential gear (hereinafter, simply referred to as "differential") 500, and an ECU (Electronic Control Unit) 600. The control apparatus according to this example embodiment is realized by a program executed by the ECU 600, for example.

The engine 200 is an internal combustion engine that operates by combusting a mixture of air and fuel injected by an injector, not shown, in a cylinder. The force generated by the combustion forces a piston, also not shown, downward to rotate a crankshaft 202. The engine 200 is mounted in the vehicle 100 as a drive source. The vehicle 100 is propelled by the driving force generated by the engine 200. Incidentally, another power system such as a motor or the like may be provided instead of the engine 200.

Figure 2:
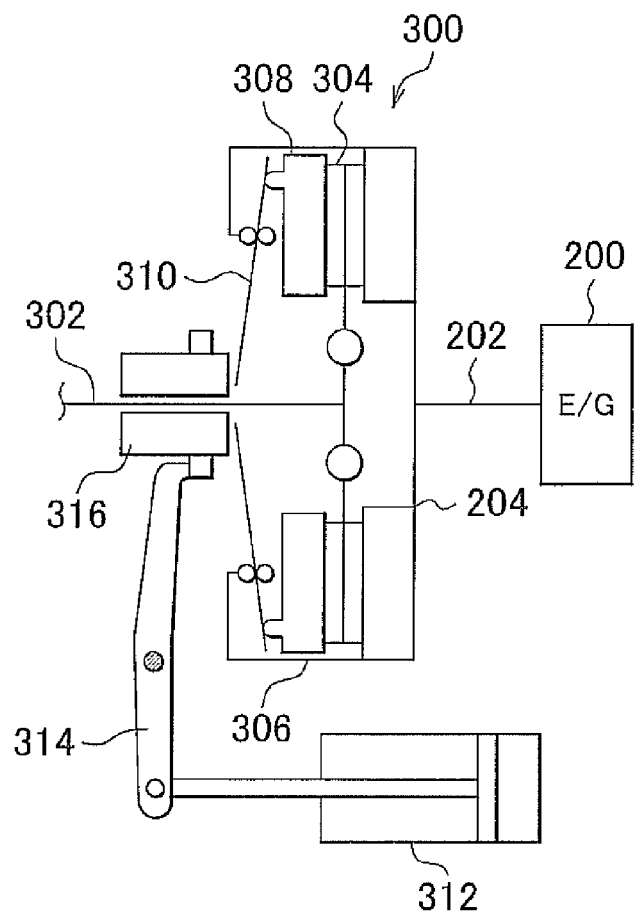
FIG. 2 is a sectional view of a clutch shown in FIG. 1.

The clutch 300 is a dry-operating single disc friction clutch. As shown in FIG. 2, the clutch 300 includes a clutch output shaft 302, a clutch disc 304 arranged on the clutch output shaft 302, a clutch housing 306, a pressure plate 308 arranged on the clutch housing 306, a diaphragm spring 310, a clutch release cylinder 312, a release fork 314, and a release sleeve 316.

The diaphragm spring 310 urges the pressure plate 308 toward the right in FIG. 2, such that the clutch disc 304 presses against a flywheel 204 that is mounted on the crankshaft 202 of the engine 200, thereby applying the clutch.

The clutch release cylinder 312 moves the release sleeve 316 toward the right in FIG. 2 via the release fork 314, such that the inside end portion of the diaphragm spring 310 moves to the right in FIG. 2. When the inside end portion of the diaphragm spring 310 moves to the right in FIG. 2, the pressure plate 308 moves to the left in FIG. 2 such that the clutch disc 304 moves away from the flywheel 204, thereby releasing the clutch.

The clutch release cylinder 312 operates by hydraulic pressure being supplied by a hydraulic circuit, not shown. The clutch release cylinder 312 is controlled by the ECU 600. The clutch 300 may uses typical technology that is well known so a further description will not be repeated here. Incidentally, the clutch 300 may also be applied and released using electric power.

Returning to FIG. 1, the transmission 400 includes an input shaft 402, an output shaft 404, and a housing 406. The transmission 400 is housed, together with the differential 500, in the housing 406. The transmission 400 is a constant mesh gear transmission.

The input shaft 402 and the output shaft 404 are provided parallel to one another. A plurality of pairs of shifting gears 411 to 415 all having different speed ratios, as well as a pair of reverse gears 416, are arranged between the input shaft 402 and the output shaft 404.

In each pair of shifting gears, one shifting gear is provided on the input shaft 402 and the other is provided on the output shaft 404. Also in each pair of shifting gears, one shifting gear is able to rotate idly with respect to the shaft on which it is provided, and the other rotates together with the shaft on which it is provided. The two gears in each pair of shifting gears are in constant mesh.

The shifting gear in each pair of shifting gears 411 to 415 that rotates idly with respect to the shaft on which it is provided is a clutch gear 421 to 425. Synchromesh mechanisms 431 to 433 which synchronize the rotation speed of the shaft with the rotation speed of the clutch gears 421 to 425 and then couple the shaft and the clutch gears 421 to 425 together are provided between the shaft and the clutch gears 421 to 425. A given speed from first speed to fifth speed is established by one of the synchromesh mechanisms 431 to 433 coupling one of the clutch gears 421 to 425 to the shaft. When none of the clutch gears are coupled to the shaft, the transmission 400 is in a neutral state.

The pair of reverse gears 416 mesh with a reverse idle gear arranged on a countershaft, not shown. Reverse speed (i.e., reverse) is established by placing the pair of reverse gears 416 into mesh with the reverse idle gear.

The synchromesh mechanisms 431 to 433 are operated, via a fork shaft 440, by an actuator 442 that is controlled by the ECU 600. The synchromesh mechanisms 431 to 433 are key type synchromesh mechanisms. Incidentally, other types of synchromesh mechanisms such as double cone synchromesh mechanisms may also be used instead of key type synchromesh mechanisms.

The input shaft 402 is coupled to the clutch output shaft 302 of the clutch 300 by splines 450, and the output gear 460 is arranged on the output shaft 404 and is in mesh with a ring gear 502 of the differential 500.

The differential 500 includes a pair of side gears 504 and 506. A drive shaft 508 is coupled by spline engagement or the like to the side gear 504, and a drive shaft 510 is coupled by spline engagement or the like to the side gear 506. Power is transmitted to left and right front wheels 512 and 514 via these drive shafts 508 and 510.

An accelerator operation amount sensor 602, a position switch 604, an engine speed sensor 606, a temperature sensor 608, an input rotation speed sensor 610, an output rotation speed sensor 612, and a stroke sensor 614 are all connected to the ECU 600.

The accelerator operation amount sensor 602 detects the accelerator operation amount and outputs a signal indicative of the detection results to the ECU 600.

The position switch 604 detects the position of a shift lever and outputs a signal indicative of the detection results to the ECU 600. The speed of the transmission 400 is automatically established according to the range (such as the D range) corresponding to the position of the shift lever. Also, a manual mode that enables the driver to select an appropriate speed according to an operation by the driver may also be selected.

The engine speed sensor 606 detects the speed of the engine 200 and outputs a signal indicative of the detection results to the ECU 600. The temperature sensor 608 detects the temperature of the coolant of the engine 200 and outputs a signal indicative of the detection results to the ECU 600.

The input rotation speed sensor 610 detects the rotation speed of the input shaft 402 and outputs a signal indicative of the detection results to the ECU 600. The output rotation speed sensor 612 detects the rotation speed of the output shaft 404 and outputs a signal indicative of the detection results to the ECU 600. The vehicle speed can be calculated from the rotation speed of the output shaft 404. For example, the vehicle speed can be calculated by dividing the rotation speed of the output shaft 404 by the gear ratio of the differential gear 500 and then multiplying the quotient by the circumference of the front wheels 512 and 514. Incidentally, typical technology that is well known may be used to calculate the vehicle speed so a detailed description will not be repeated here.

The stroke sensor 614 detects the stroke amount (i.e., the amount of movement of the release sleeve 316) of the actuator 442 and outputs a signal indicative of the detection results to the ECU 600.

The ECU 600 controls a variety of equipment based on the signals sent from these sensors and a throttle opening amount sensor, not shown, and the like, and maps and programs stored in ROM (Read Only Memory), such that the vehicle 100 runs in the desired state.

Figure 3:
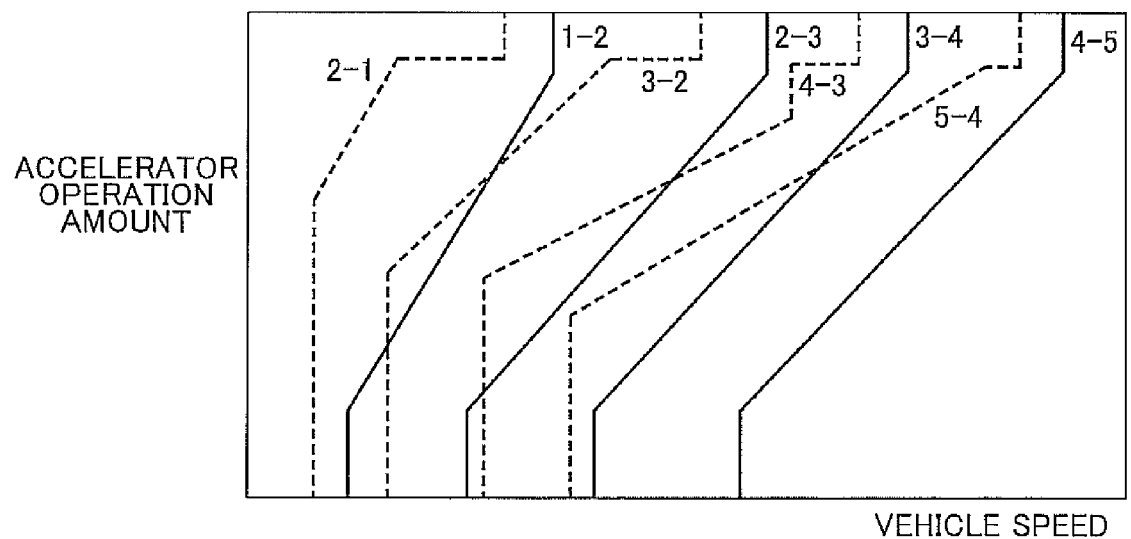
FIG. 3 is a view of a shift map of the transmission of the transmission shift apparatus according to these example embodiments.

In this example embodiment, during normal shift control the ECU 600 determines the speed to be established based on a shift map shown in FIG. 3. In the shift map, the speed to be established is determined by the vehicle speed and the accelerator operation amount. As the accelerator operation amount increases, a lower speed is requested. That is, a larger speed ratio is requested as the accelerator operation amount increases. Also, as the vehicle speed increases, a higher speed is requested. That is, a lower speed ratio is requested as the vehicle speed increases.

The solid lines in FIG. 3 are upshift lines. These upshift lines establish an upshift condition, i.e., determine the vehicle speed and the accelerator operation amount at which an upshift will be performed. The broken lines are downshift lines. These downshift lines establish a downshift condition, i.e., determine the vehicle speed and the accelerator operation amount at which a downshift will be performed. As shown in FIG. 3, hysteresis is provided between the upshift lines and the downshift lines.

For example, when the operating state of the vehicle determined by the combination of the vehicle speed and the accelerator operation amount shifts from the region to the left of an upshift line to the region to the right of the upshift line, it is determined that the upshift condition is satisfied. Conversely, when the operating state of the vehicle determined by the combination of the vehicle speed and the accelerator operation amount shifts from the region to the right of an upshift line to the region to the left of the upshift line, it is determined that the upshift condition is no longer (i.e., ceases to be) satisfied. The determination as to whether the upshift condition is satisfied or ceases to be satisfied is made for each type of shift (i.e., for each combination of the speed before an upshift and the speed after the upshift).

Similarly, when the operating state of the vehicle determined by the combination of the vehicle speed and the accelerator operation amount shifts from the region to the right of a downshift line to the region to the left of the downshift line, it is determined that the downshift condition is satisfied. Conversely, when the operating state of the vehicle determined by the combination of the vehicle speed and the accelerator operation amount shifts from the region to the left of a downshift line to the region to the right of the downshift line, it is determined that the downshift condition is no longer (i.e., ceases to be) satisfied. The determination as to whether the downshift condition is satisfied or ceases to be satisfied is made for each type of shift (i.e., for each combination of the speed before a downshift and the speed after the downshift).

The upshift and downshifts condition are established on the shift map to satisfy rules in which a larger speed ratio is requested as the accelerator operation amount increases and a smaller speed ratio is requested as the vehicle speed increases.

Incidentally, typical technology that is well known may be used for the shift map so a detailed description thereof will not be repeated here.

Figure 4:
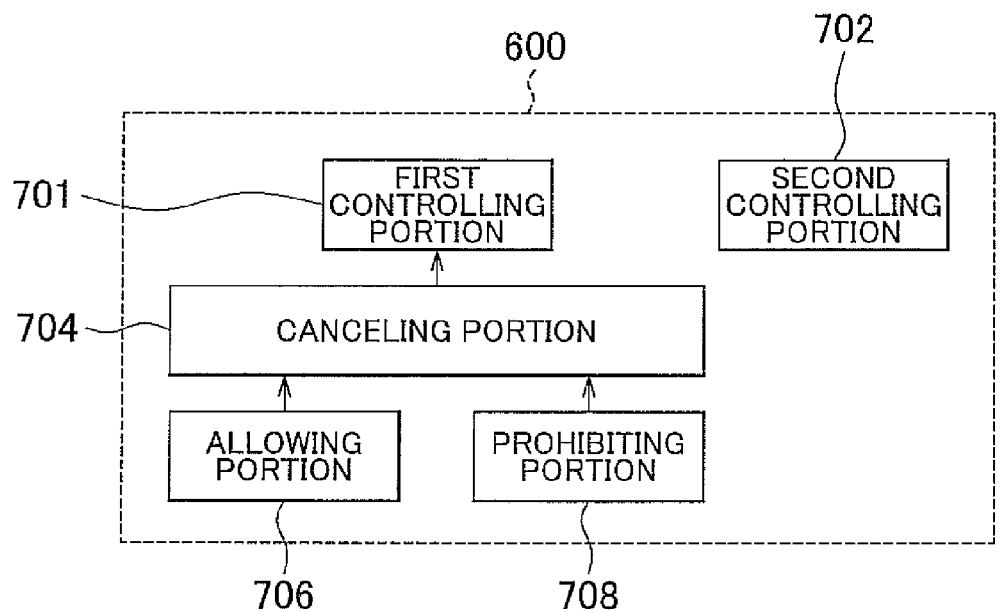
FIG. 4 is a functional block diagram of an ECU in a first example embodiment of the invention.

Now the ECU 600 will be described in more detail with reference to FIG. 4. Incidentally, the function of the ECU 600 may be realized by software or hardware. Also, the ECU 600 may be divided into a plurality of ECUs.

The ECU 600 is provided with a first controlling portion 701, a second controlling portion 702, a canceling portion 704, an allowing portion 706, and a prohibiting portion 708.

The first controlling portion 701 controls the transmission 400 to upshift when the upshift condition is satisfied. During an upshift, the clutch 300 is first released, then the transmission 400 changes speeds, and then the clutch 300 is applied again.

The second controlling portion 702 controls the transmission 400 to downshift when the downshift condition is satisfied. Similar to an upshift, during a downshift, the clutch 300 is first released, then the transmission 400 changes speeds, and then the clutch 300 is applied again.

Figure 5:
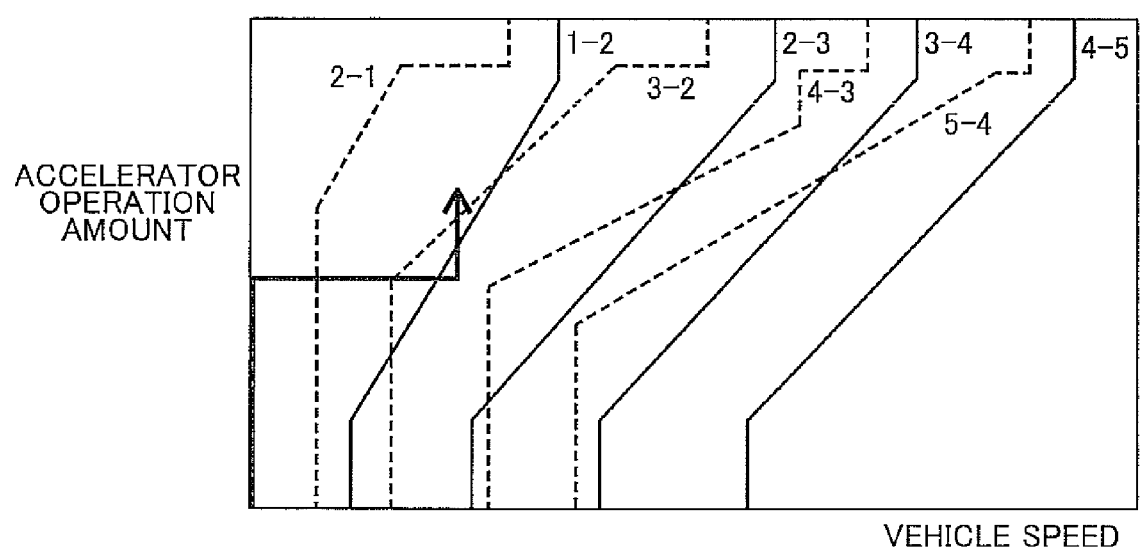
FIG. 5 is a view illustrating a change in the operating state of the vehicle in the first example embodiment on the shift map.

The canceling portion 704 cancels an upshift and maintains the speed ratio, i.e., the speed, of the transmission 400 when, after the upshift condition has been satisfied but before the upshift is completed (i.e., during an upshift), the upshift condition ceases to be satisfied, i.e., is no longer satisfied, as shown by the arrow in FIG. 5. That is, the transmission 400 is controlled to reestablish the speed established prior to the control to upshift.

The canceling portion 704 cancels the upshift and maintains the speed ratio of the transmission when the upshift condition ceases to be satisfied even if the downshift condition is not satisfied, as shown in FIG. 5. Incidentally, an upshift is also canceled and the speed ratio of the transmission 400 is maintained even if the upshift condition ceases to be satisfied and the downshift condition is satisfied.

The allowing portion 706 allows an upshift to be canceled if the clutch 300 has not yet been released for an upshift, or if the timing at which driving force can be obtained by canceling the upshift is earlier than the timing at which driving force can be obtained by continuing the upshift.

Here, the timing at which driving force can be obtained by canceling the upshift refers to the timing at which the speed finishes returning to the speed established before the upshift condition had been satisfied. Also, the timing at which driving force can be obtained by continuing the upshift refers to the timing at which the upshift is completed.

The timing at which driving force can be obtained by canceling the upshift and the timing at which driving force can be obtained by continuing the upshift are calculated using, for example, a map or an operation that uses the degree to which the upshift has progressed and the rate of change in the rotation speed of the input shaft of the transmission 400 and the like as variables.

The degree to which the upshift has progressed can be indicated by, for example, the ratio of the difference between the synchronous rotation speed in the speed before the upshift and the synchronous rotation speed in the speed after the upshift, to the difference between the rotation speed of the input shaft of the transmission 400 and the synchronous rotation speed in the speed after the upshift.

Incidentally, the methods for calculating the timing at which driving force can be obtained by canceling an upshift and the timing at which driving force can be obtained by continuing an upshift are not limited to these.

The prohibiting portion 708 prohibits an upshift from being canceled when the timing at which driving force can be obtained by canceling an upshift is later than the timing at which driving force can be obtained by continuing an upshift, and the clutch 300 has already been released for an upshift.

Incidentally, the determination as to whether to allow or prohibit cancelation of an upshift may also be made taking only one of the state of the clutch 300 or the timing at which driving force can be obtained into account.

That is, cancelation of an upshift may be allowed if the clutch 300 has not already been released for the upshift, and cancelation of an upshift may be prohibited if the clutch 300 has already been released.

Also, cancelation of an upshift may be allowed if the timing at which driving force can be obtained by canceling the upshift is earlier than the timing at which driving force can be obtained by continuing the upshift, and cancelation of an upshift may be prohibited if the timing at which driving force can be obtained by canceling the upshift is later than the timing at which driving force can be obtained by continuing the upshift.

Figure 6:
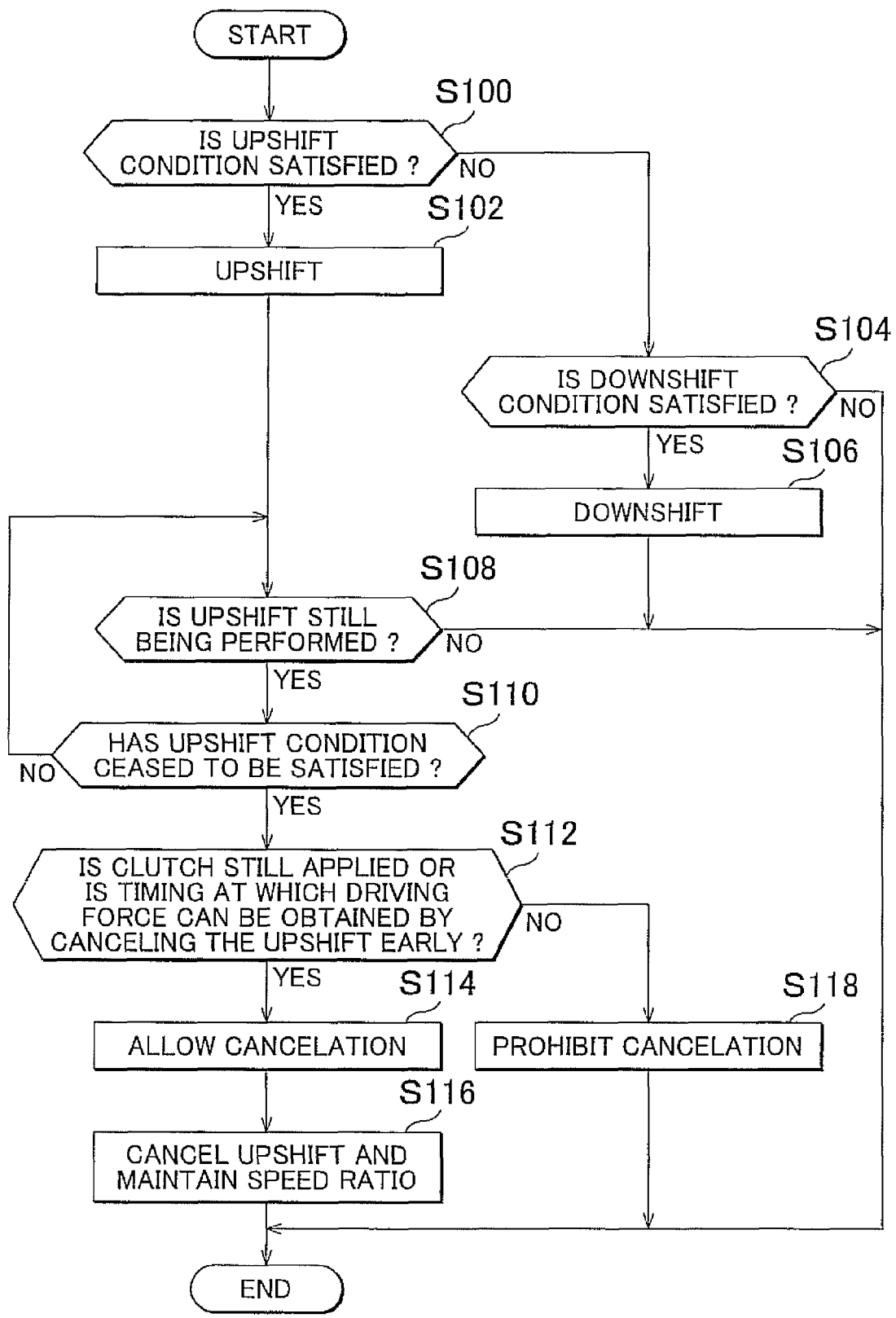
FIG. 6 is a flowchart illustrating the control structure of a program executed by the ECU in the first example embodiment.

Now the control structure of a program executed by the ECU 600 will be described with reference to FIG. 6. The program described below is executed repeatedly at predetermined intervals of time.

In step S100, the ECU 600 determines whether an upshift condition is satisfied. If an upshift condition is satisfied (i.e., YES in step S100), the process proceeds on to step S102. If not (i.e., NO in step S100), the process proceeds on to step S104. In step S102, the ECU 600 controls the transmission 400 to upshift.

In step S104, the ECU 600 determines whether a downshift condition is satisfied. If a downshift condition is satisfied (i.e., YES in step S104), the process proceeds on to step S106. If not (i.e., NO in step S104), this cycle of the program ends. In step S106, the ECU 600 controls the transmission 400 to downshift.

In step S108, the ECU 600 determines whether the upshift is still being performed (i.e. whether the upshift has not yet ended). If the upshift is still being performed (i.e., YES in step S108), the process proceeds on to step S110. If not (i.e., NO in step S108), then this cycle of the program ends.

In step S110, the ECU 600 determines whether the upshift condition has ceased to be satisfied, i.e., is no longer satisfied. If the upshift condition has ceased to be satisfied (i.e., YES in step S110), the process proceeds on to step S112. If not (i.e., NO in step S110), the process returns to step S108.

In step S112, the ECU 600 determines whether the clutch is still applied (i.e. the clutch 300 has not yet been released for the upshift), or whether the timing at which driving force can be obtained by canceling the upshift is earlier than the timing at which driving force can be obtained by continuing the upshift.

If the clutch 300 is still applied or if the timing at which driving force can be obtained by canceling the upshift is earlier than the timing at which driving force can be obtained by continuing the upshift (i.e., YES in step S112), the process proceeds on to step S114. If not (i.e., NO in step S112), the process proceeds on to step S118.

In step S114, the ECU 600 allows the upshift to be canceled. In step S116, the ECU 600 cancels the upshift and maintains the speed ratio, i.e., the speed, of the transmission 400. The upshift is canceled and the speed ratio of the transmission 400 is maintained even if a downshift condition is not satisfied. Incidentally, the upshift is also canceled and the speed ratio of the transmission 400 is maintained even if a downshift condition is satisfied.

In step S118, the ECU 600 prohibits the upshift from being canceled. That is, the upshift is continued. Then this cycle of the program ends.

The shift operation in this example embodiment, which is based on the foregoing structure and flowchart, will now be described.

If an upshift condition is satisfied while the vehicle is traveling (i.e., YES in step S100), the transmission 400 is controlled to upshift (step S102). Similarly, if a downshift condition is satisfied while the vehicle is traveling (i.e., YES in step S104), the transmission 400 is controlled to downshift (step S106).

Figure 7:
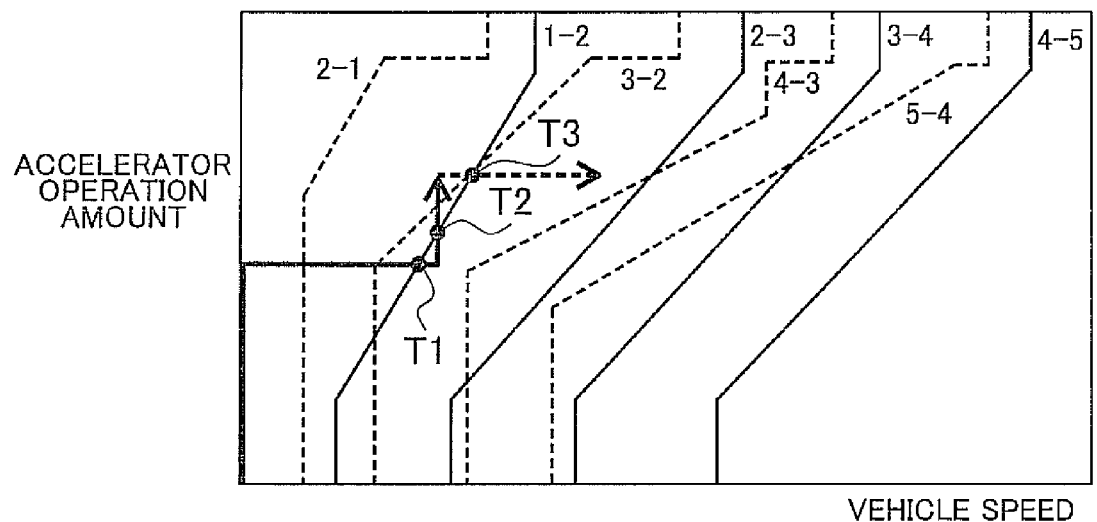
FIG. 7 is a view of time T1 at which an update condition is satisfied and time T2 at which the upshift condition ceases to be satisfied in the first example embodiment.
Figure 8:
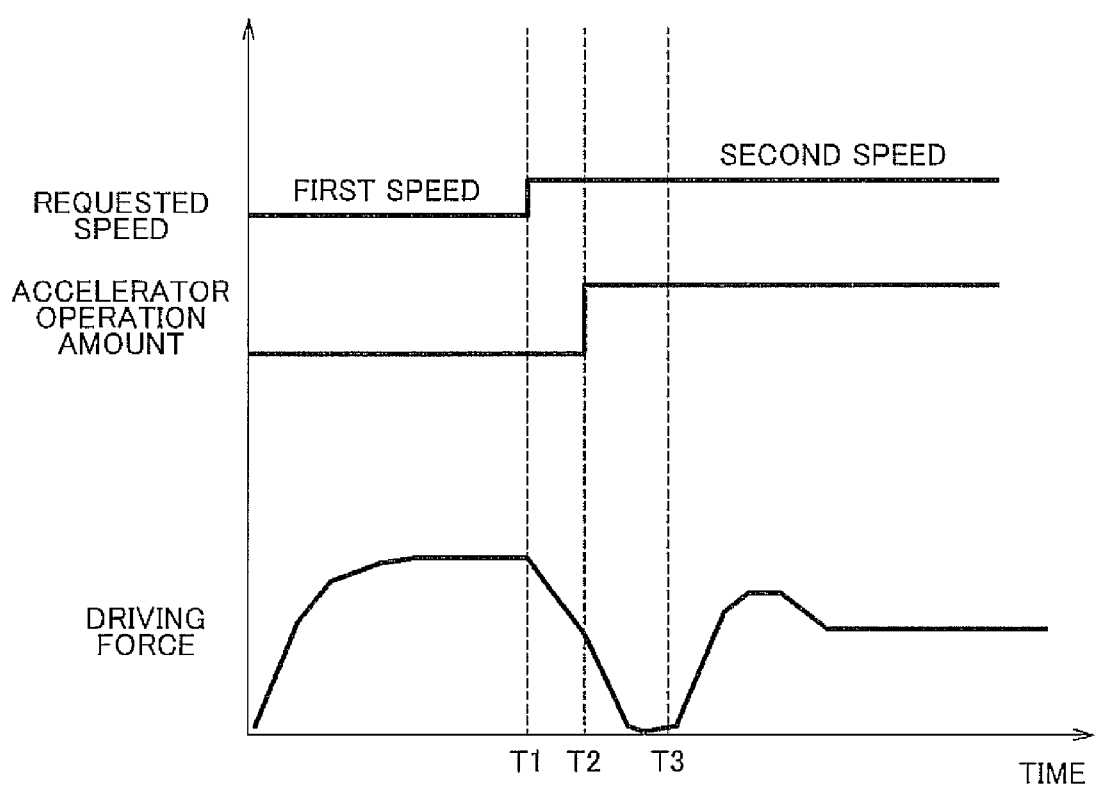
FIG. 8 is a view illustrating a change in driving force, which shows that the driving force necessary to achieve the acceleration required by the driver is unable to be obtained with the related control apparatus.

In the case of an upshift according to the shift map in FIG. 7, it is possible that the upshift condition may cease to be satisfied at time T2 before the upshift is completed if the accelerator operation amount increases right after the upshift condition is satisfied at time T1.

In this case, with the control apparatus according to related art, the upshift may continue despite the fact that the driver requires acceleration. As a result, it may no longer be possible to obtain the driving force necessary to achieve the acceleration required by the driver.

Figure 9:
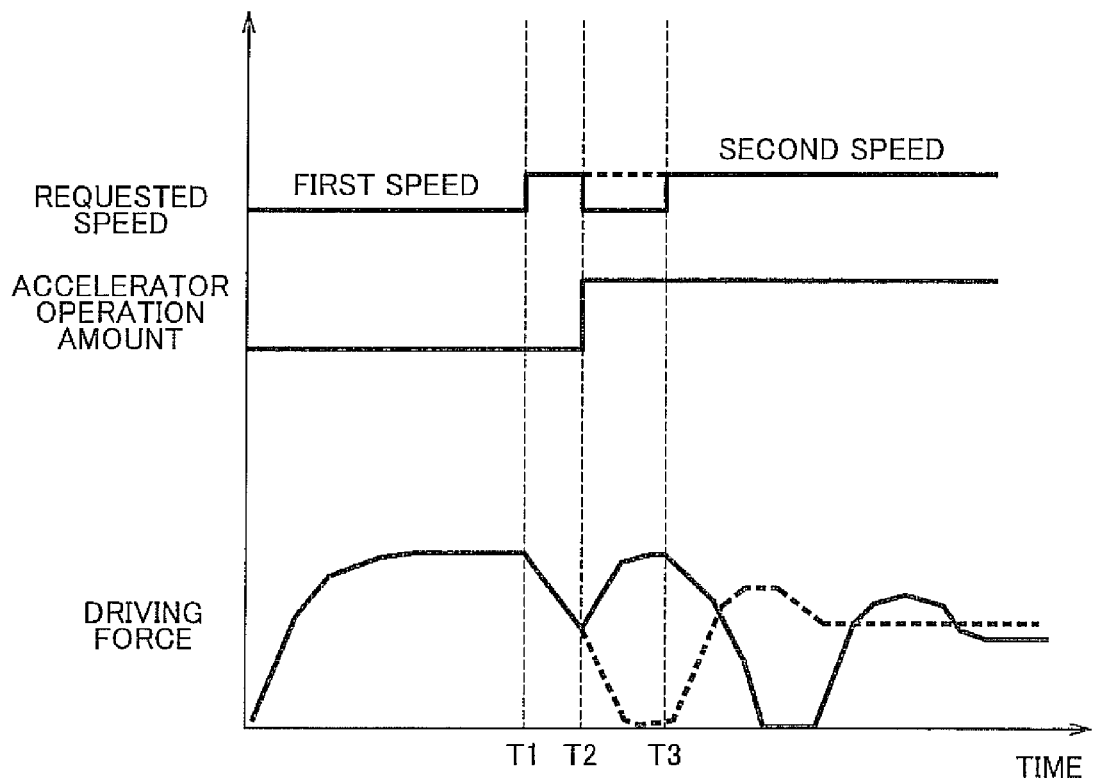
FIG. 9 is a view illustrating the change in driving force when the driving force is inhibited from becoming insufficient by the control apparatus according to the first example embodiment.

Therefore, if a upshift condition ceases to be satisfied (i.e., YES in step S110) before the upshift is completed (i.e., YES in step S108), the upshift is canceled and the speed ratio of the transmission 400 is maintained, as shown in FIG. 9, even if a downshift condition is not satisfied (step S114). Accordingly, the driving force will not decrease until an upshift is executed when the upshift condition is once again satisfied at time T3. Thus, it is possible to inhibit the driving force from becoming insufficient.

However, if the clutch 300 is still applied or if the timing at which driving force can be obtained by canceling the upshift is earlier than the timing at which driving force can be obtained by continuing the upshift (step S112), the upshift is allowed to be canceled (step S114). Accordingly, the upshift is canceled and the speed ratio of the transmission 400 is maintained (step S114).

If, on the other hand, the timing at which driving force can be obtained by canceling the upshift is later than the timing at which driving force can be obtained by continuing the upshift, and the clutch 300 has already been released for the upshift (step S116), the upshift is prohibited from being canceled (step S118), so the upshift is continued.

Accordingly, the upshift is either canceled or continued, whichever enables driving force to be obtained faster. This also makes it possible to more effectively inhibit driving force from becoming insufficient.

A second example embodiment of the invention will now be described. This second example embodiment differs from the first example embodiment described above in that an upshift is restricted after an upshift has been canceled. The other structure is the same as that of the first example embodiment described above, so a detailed description thereof will not be repeated.

Figure 10:
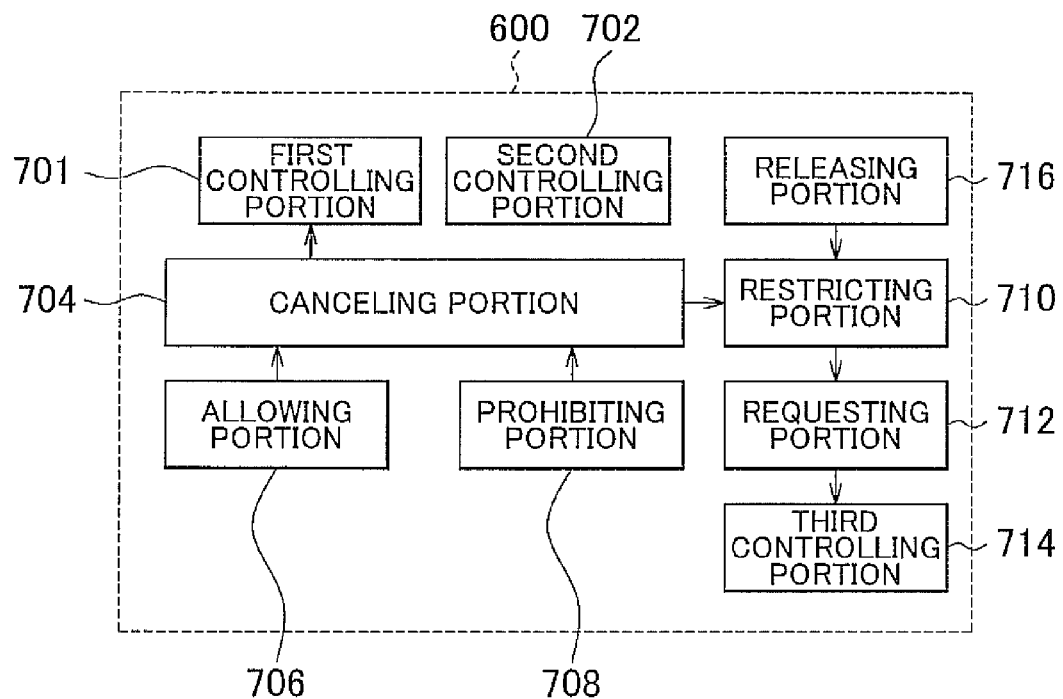
FIG. 10 is a functional block diagram of an ECU according to a second example embodiment of the invention.

The function of the ECU 600 in this example embodiment will now be described with reference to FIG. 10. The ECU 600 is provided with a restricting portion 710, a requesting portion 712, a third controlling portion 714, and a releasing portion 716, in addition to the first controlling portion 701, the second controlling portion 702, the canceling portion 704, the allowing portion 706, and the prohibiting portion 708.

Incidentally, the functions of the first controlling portion 701, the second controlling portion 702, the canceling portion 704, the allowing portion 706, the prohibiting portion 708 are the same as they are in the first example embodiment described above, so detailed descriptions thereof will not be repeated here.

The restricting portion 710 restricts an upshift executed as a result of an upshift condition being satisfied, after an upshift has been canceled. That is, an upshift to a speed requested (i.e., to be established) based on the shift map is restricted even if an upshift condition is satisfied.

The requesting portion 712 requests a speed ratio based on a rule of requesting a smaller speed ratio each time a predetermined period of time passes when an upshift to be executed as a result of an upshift condition being satisfied is restricted.

More specifically, the requesting portion 712 requests a speed that is one speed higher than the currently established speed, each time the count time of a timer for determining whether to allow an upshift of one speed (hereinafter simply referred to as "upshift timer") becomes equal to or greater than a threshold value.

Incidentally, the threshold value of the count time is set to a value that will not give the driver the impression of busy shifting when an upshift is executed consecutively at intervals corresponding to the threshold value. The upshift timer is reset every time a speed that is one speed higher than the currently established speed is requested.

The third controlling portion 714 controls the transmission 400 so that it changes to the speed ratio requested by the requesting portion 712 while the speed ratio requested by the requesting portion 712 is equal to or greater than the speed ratio requested based on the shift map. Here, considering that the invention may be applied to various types of transmissions, the third control portion 714 controls the transmission 400 based on the speed ratio as described above, but in this example embodiment, the transmission is the transmission 400, i.e., a stepped transmission, so "speed ratio" is replaced by "speed" and the third controlling portion 714 controls the transmission 400 based on the speed.

That is, while the speed requested as a result of the count time of the upshift timer being equal to or greater than the threshold value is equal to or less than the speed requested based on the shift map, the transmission 400 is controlled to establish the speed requested as a result of the count time of the upshift timer being equal to or greater than the threshold value.

The releasing portion 716 releases a restriction on an upshift to be executed due to an upshift condition being satisfied, when the speed ratio requested by the requesting portion 712 becomes lower than the speed ratio requested based on a first rule.

That is, a restriction on an upshift to be executed due to an upshift condition being satisfied is released when the speed requested as a result of the count time of the upshift timer being equal to or greater than the threshold value becomes higher than the speed requested based on the shift map (i.e., becomes a higher speed).

Figure 11:
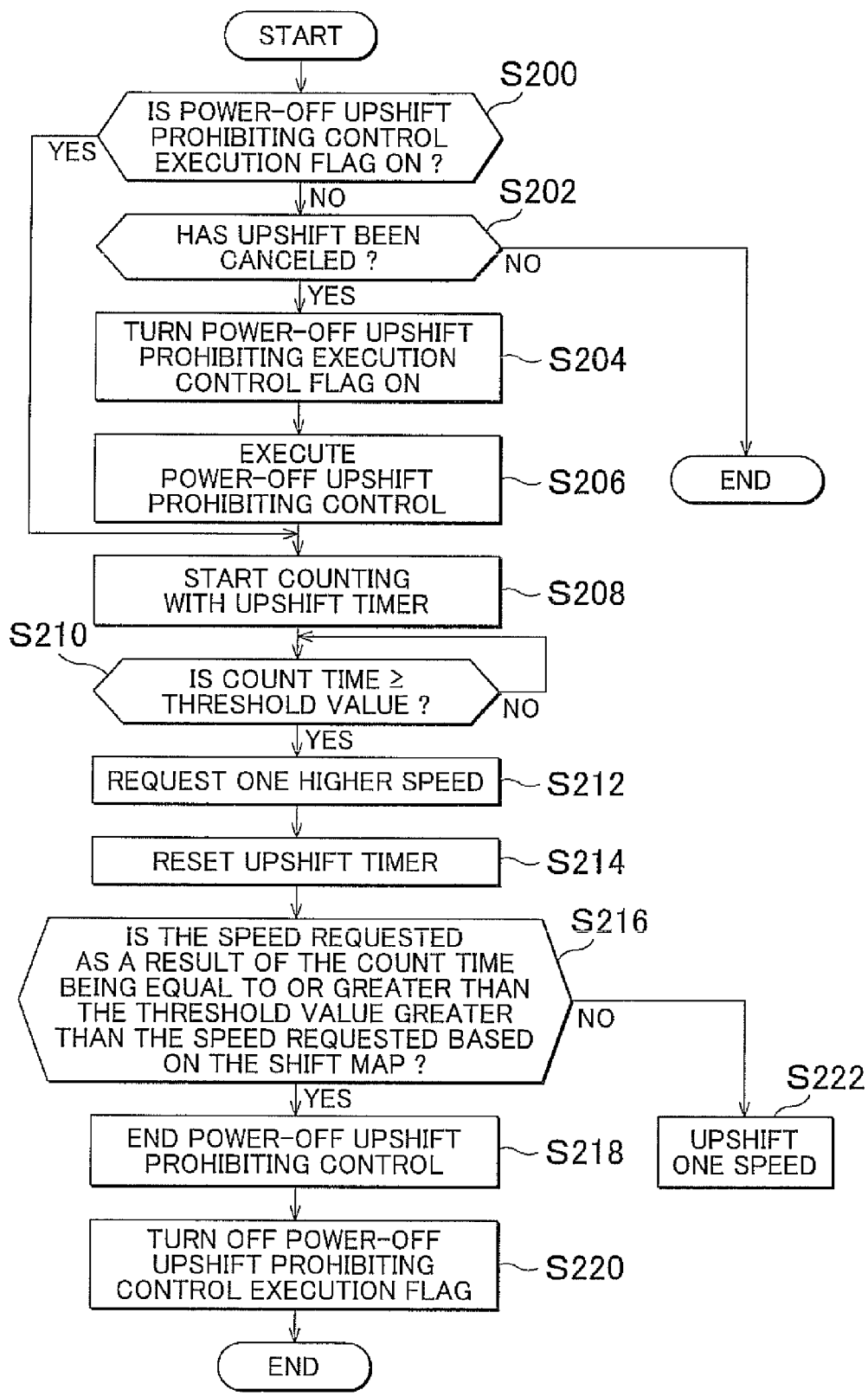
FIG. 11 is a flowchart illustrating the control structure of a program executed by the ECU in the second example embodiment.

Now the control structure of a program executed by the ECU 600 which serves as the control apparatus according to this example embodiment will be described with reference to FIG. 11. Incidentally, the program described below is repeatedly executed in predetermined cycles.

In step S200, the ECU 600 determines whether a power-off upshift prohibiting control execution flag is on. If the power-off upshift prohibiting control execution flag is on (i.e., YES in step S200), the process proceeds on to step S208. If not (i.e., NO in step S200), the process proceeds on to step S202.

In step S202, the ECU 600 determines whether the upshift has been canceled. If the upshift has been canceled (i.e., YES in step S202), the process proceeds on to step S204. If not (i.e., NO in step S202), then this cycle of the program ends.

In step S204, the ECU 600 turns the power-off upshift prohibiting control execution flag on. In step S206, the ECU 600 executes power-off upshift prohibiting control. Executing this power-off upshift prohibiting control prohibits an upshift into the speed requested based on the shift map.

In step S208, the ECU 600 starts the count of the upshift timer. The elapsed time starts to be measured when the count of the upshift timer starts.

In step S210, the ECU 600 determines whether the count time of the one upshift allowance determining timer is equal to or greater than a threshold value. Here, the threshold value of the count time is set to a value that will not give the driver the impression of busy shifting when an upshift is executed consecutively at intervals corresponding to the threshold value. If the count time of the upshift timer is equal to or greater than the threshold value (i.e., YES in step S210), the process proceeds on to step S212. If not (i.e., NO in step S210), the process repeats step S210.

In step S212, the ECU 600 requests a speed that is one speed higher than the currently established speed. Then in step S214 the ECU 600 resets the upshift timer.

In step S216, the ECU 600 determines whether the speed requested as a result of the count time of the upshift timer being equal to or greater than the threshold value is higher (i.e., is a higher speed) than the speed requested based on the shift map. That is, it is determined whether the speed ratio requested as a result of the count time of the upshift timer being equal to or greater than the threshold value is smaller than the speed ratio requested based on the shift map. If the speed requested as a result of the count time of the upshift timer being equal to or greater than the threshold value is higher than the speed requested based on the shift map (i.e., YES in step S216), the process proceeds on to step S218. If not (i.e., NO in step S216), the process proceeds on to step S222.

In step S218, the ECU 600 ends the power-off upshift prohibiting control without upshifting. Then in step S220, the ECU 600 turns off the power-off upshift prohibiting control execution flag, after which this cycle of the program ends. In step S222, the ECU 600 controls the transmission 400 to upshift one speed, after which this cycle of the program ends.

The shift operation in this example embodiment, which is based on the foregoing structure and flowchart, will now be described.

During normal running, the transmission 400 is controlled to establish the speed requested based on the shift map. In this case, the power-off upshift prohibiting control execution flag is off (i.e., NO in step S200).

On the other hand, if an upshift is canceled (i.e., YES in step S202), the power-off upshift prohibiting control execution flag is turned on (step S204), and power-off upshift prohibiting control is executed (step S206). When the power-off upshift prohibiting control is executed, the upshift timer starts to count up in preparation for executing an upshift into a speed that is one speed higher than the currently established speed (step S208).

Figure 12:
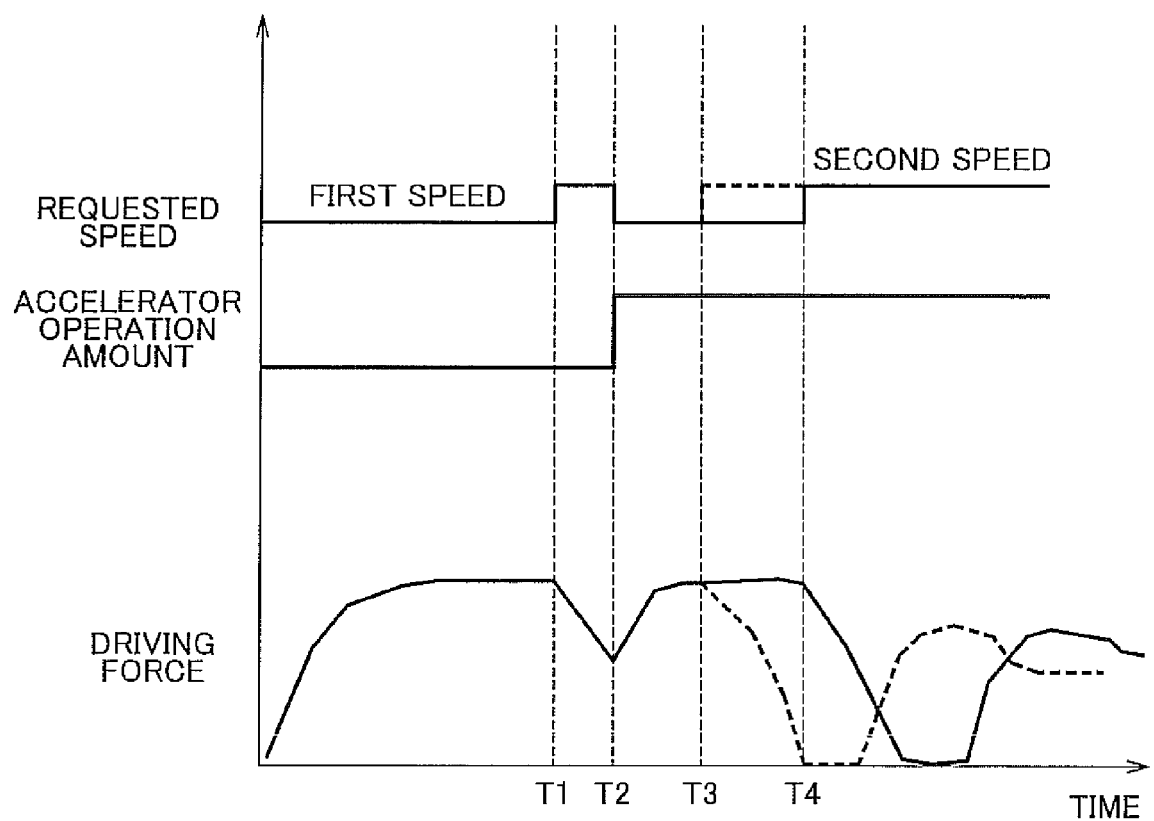
FIG. 12 is a view illustrating a change in driving force according to the second example embodiment.

Also, when the power-off prohibiting control is executed, an upshift is prohibited even if the speed requested based on the shift map changes to a higher speed by the upshift condition once again being satisfied at time T3 in FIG. 12. This differs from the first example embodiment described above.

If the count time of the upshift timer is equal to or greater than the threshold value at time T4 in FIG. 12 (i.e., YES in step S210), a speed that is one speed higher is requested (step S212) and the upshift timer is reset (step S214). If the actual speed is first speed, then second speed is requested, as shown in FIG. 12.

If the requested speed is equal to or less than the speed requested based on the shift map when one higher speed is requested (i.e., NO in step S216), an upshift of one speed is executed as shown in FIG. 12 (step S222).

Accordingly, after an upshift has been canceled, an upshift can be executed after first maintaining the speed ratio for a period of time that corresponds to the threshold value even if an upshift condition is satisfied. As a result, busy shifting can be suppressed.

If, on the other hand, the speed requested as a result of the count time of the upshift timer being equal to or greater than the threshold value is higher than the speed requested based on the shift map (i.e., YES in step S216), an upshift is not performed and the power-off upshift prohibiting control ends (step S218). Accordingly, the power-off upshift prohibiting control execution flag is turned off (step S220).

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A control apparatus for a transmission, comprising:
   a first controlling portion that controls the transmission to execute an upshift when an upshift condition is satisfied;
   a second controlling portion that controls the transmission to execute a downshift when a downshift condition is satisfied; and
   a first canceling portion which, after the upshift condition is satisfied but before the upshift is completed, cancels the upshift and maintains a speed ratio of the transmission when the upshift condition ceases to be satisfied while the downshift condition is not satisfied.

2. The control apparatus for a transmission according to claim 1, further comprising:
   a second canceling portion that allows the upshift to be canceled if timing at which driving force is obtained by canceling the upshift is earlier than timing at which driving force is obtained by continuing the upshift, and prohibits the upshift from being canceled if the timing at which driving force is obtained by canceling the upshift is later than the timing at which driving force is obtained by continuing the upshift.

3. The control apparatus for a transmission according to claim 2, further comprising:
   a restricting portion that restricts an upshift to be executed as a result of the upshift condition being satisfied after an upshift is canceled, the upshift condition being established to satisfy a first rule of requesting a larger speed ratio as an accelerator operation amount increases and requesting a smaller speed ratio as a vehicle speed increases;
   a requesting portion that requests a speed ratio based on a second rule of requesting a smaller speed ratio each time a predetermined period of time passes, when the upshift to be executed as the result of the upshift condition being satisfied is restricted;
   a third controlling portion that controls the transmission to establish the speed ratio requested based on the second rule while the speed ratio requested based on the second rule is equal to or greater than the speed ratio requested based on the first rule; and a restriction releasing portion that releases the restriction on an upshift to be executed as the result of the upshift condition being satisfied, when the speed ratio requested based on the second rule becomes smaller than the speed ratio requested based on the first rule.

4. The control apparatus for a transmission according to claim 1, wherein the transmission is coupled to a drive source via an apply element that is able to be switched between an applied state and a released state, and the apply element is released during execution of an upshift, further comprising:
 a third canceling portion that allows the upshift to be canceled before the apply element is released and prohibits the upshift from being canceled after the apply element is released.

5. The control apparatus for a transmission according to claim 4, further comprising:
 a restricting portion that restricts an upshift to be executed as a result of the upshift condition being satisfied after an upshift is canceled, the upshift condition being established to satisfy a first rule of requesting a larger speed ratio as an accelerator operation amount increases and requesting a smaller speed ratio as a vehicle speed increases;
 a requesting portion that requests a speed ratio based on a second rule of requesting a smaller speed ratio each time a predetermined period of time passes, when the upshift to be executed as the result of the upshift condition being satisfied is restricted;
 a third controlling portion that controls the transmission to establish the speed ratio requested based on the second rule while the speed ratio requested based on the second rule is equal to or greater than the speed ratio requested based on the first rule; and
 a restriction releasing portion that releases the restriction on the upshift to be executed as the result of the upshift condition being satisfied, when the speed ratio requested based on the second rule becomes smaller than the speed ratio requested based on the first rule.

6. The control apparatus for a transmission according to claim 1, further comprising:
 a restricting portion that restricts an upshift to be executed as a result of the upshift condition being satisfied after an upshift is canceled, the upshift condition being established to satisfy a first rule of requesting a larger speed ratio as an accelerator operation amount increases and requesting a smaller speed ratio as a vehicle speed increases;
 a requesting portion that requests a speed ratio based on a second rule of requesting a smaller speed ratio each time a predetermined period of time passes, when the upshift to be executed as the result of the upshift condition being satisfied is restricted;
 a third controlling portion that controls the transmission to establish the speed ratio requested based on the second rule while the speed ratio requested based on the second rule is equal to or greater than the speed ratio requested based on the first rule; and
 a restriction releasing portion that releases the restriction on the upshift to be executed as the result of the upshift condition being satisfied, when the speed ratio requested based on the second rule becomes smaller than the speed ratio requested based on the first rule.

* * * * *

UNITED STATES PATENT AND TRADEMARK OFFICE
CERTIFICATE OF CORRECTION

| | |
|---|---|
| PATENT NO. | : 7,926,375 B2 |
| APPLICATION NO. | : 12/578867 |
| DATED | : April 19, 2011 |
| INVENTOR(S) | : Hideo Watanabe |

It is certified that error appears in the above-identified patent and that said Letters Patent is hereby corrected as shown below:

Column 13, line 2 replace "an" with --the--

Signed and Sealed this
Thirteenth Day of September, 2011

David J. Kappos
*Director of the United States Patent and Trademark Office*